(12) United States Patent
Itoh

(10) Patent No.: US 6,406,160 B1
(45) Date of Patent: Jun. 18, 2002

(54) LIGHT INCIDENT SURFACE WITH SLOPED SURFACES

(75) Inventor: Atsushi Itoh, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/614,911

(22) Filed: Jul. 12, 2000

(30) Foreign Application Priority Data

Jul. 16, 1999 (JP) .......................................... 11-203748

(51) Int. Cl.[7] ................................................. F21V 7/04
(52) U.S. Cl. ........................... 362/31; 349/65; 362/551; 362/561
(58) Field of Search ................................ 362/551, 561, 362/31; 349/65, 62; 385/146

(56) References Cited

U.S. PATENT DOCUMENTS 5,961,197 A * 10/1999 Watai et al. ................... 362/31
5,986,727 A * 11/1999 Fukui et al. ................... 349/65
5,997,148 A * 12/1999 Ohkawa ........................ 362/31
6,199,994 B1 * 3/2001 Watai ........................... 362/31
6,217,184 B1 * 4/2001 Koike et al. ................... 362/31

* cited by examiner

*Primary Examiner*—Sandra O'Shea
*Assistant Examiner*—Jacob Y. Choi
(74) *Attorney, Agent, or Firm*—Oblon, Spivak, McClelland, Maier & Neustadt, P.C.

(57) ABSTRACT

A sheet-like light source device of side-light type comprising a light-conducting plate, at least one rod-like light source disposed proximate to a light-incident surface comprising at least one lateral side end portion of the light-conducting plate, a tubular reflecting member, and a planar reflecting member. Sloped surfaces which are inclined with respect to the light-incident surface of the light-conducting plate are formed proximate to positions of the light-incident surface of the light-conducting plate at which a luminous energy of the rod-like light source is decreased. It is possible to effectively eliminate generation of irregularities of brightness also in case the sheet-like light source device employs a light-conducting plate having no scattering portions through printing.

6 Claims, 6 Drawing Sheets

LIGHT INCIDENT SURFACE WITH SLOPED SURFACES

BACKGROUND OF THE INVENTION

The present invention relates to a sheet-like light source device. More particularly, it relates to a sheet-like light source device which is employed as a backlight of a liquid crystal display device, wherein the sheet-like light source device is capable of eliminating irregularities in brightness generated at peripheries of electrode portions of a rod-like light source such as a lamp.

A sheet-like light source device as illustrated in FIGS. 5 and 6 is conventionally used a backlight in a liquid crystal display device. Such a conventional sheet-like light source device is composed of a lamp 21 serving as a rod-like light source, a lamp reflector 22 serving as a tubular reflection member, a light-conducting plate 23, and a reflecting sheet 24 serving as a planar reflecting member. The lamp 21 mainly comprises a cold-cathode tube (CFL), and light emitted from the lamp 21 is made incident on the light-conducting plate 23, either directly or via the lamp reflector 22. A transparent material is used as the light-conducting plate 23, and polymethyl methacrylate (PMMA) exhibiting high transmission rate of light is generally used. As illustrated in FIG. 6, light which is made incident on a light-incident surface 23a of the light-conducting plate 23 at an angle of $\theta_{21}$ is refracted, and its angle $\theta_{22}$ within the light-conducting plate 23 will be in a range of 0 to 42° owing to Snell's law of fraction. Light will thereafter hit against a front surface 23b or rear surface 23c of the light-conducting plate 23, wherein the incident angle $\theta_{23}$ is represented by 90°−$\theta_{22}$ and will be in a range of 48 to 90°. Since a total reflection angle of PMMA is 42°, $\theta_{23}$ will be a total reflection angle. In other words, all of light made incident from the light-incident surface 23a of the light-conducting plate 23 will satisfy a total reflection condition and will not be emitted from the front surface 23b or rear surface 23c of the light-conducting plate 23. The rear surface 23c of the light-conducting plate 23 is thus devised to emit light therefrom to the front surface 23b by forming a scattering portion 25 generally through white printing. Light will be scattered when hitting against this scattering portion 25 to thereby break the total reflection condition of light within the light-conducting plate 23, so that light will be emitted from the front surface 23b which is a display surface side of the light-conducting plate 23. This scattering portion 25 is made of a material which does not perform absorption, but only perform scattering of light. Light which has been scattered at the scattering portion 25 will be also scattered to the rear surface 23c which is a non-display surface side of the light-conducting plate 23, so that a reflecting sheet 24 is placed on the rear surface 23c for reflecting this light to the front surface 23b on the display surface side. The reflecting sheet 24 is generally disposed to extend to the interior of the lamp reflector 22 as illustrated in FIG. 6.

Accompanying downsizing of personal computers in these years, narrow framing (that is, decreasing the width of frame 26 as illustrated in FIG. 7) of liquid crystal display devices is also being strongly wanted. However, the lamp 21 includes not only an essential light-emitting region but also a region which does not emit light such as electrode portion 21a, wherein the latter affects the display portion of the backlight (wherein the electrode portion 21a is illustrated to be drawn outside of the frame 26 for ease of understanding in FIG. 7), so that irregularities in brightness X are generated in proximities of both ends of the lamp 21 at which luminous energy is decreased. If it should be possible to effectively eliminate such irregularities in brightness X, the length of the lamp 21 can be shortened up to a dimension of the display portion. In other words, the outer diametric dimension of the backlight can be reduced which is an extremely important technique for achieving narrow framing.

A conventional method which is taken for eliminating irregularities in brightness X is a method for increasing the scattering portion 25 formed on the rear surface 23c of the light-conducting plate 23 of FIG. 6 through printing. However, light-conducting plates are becoming popular in these years which are of a type with no scattering portion 25 being formed on the rear surface 23c of the light-conducting plate 23 through printing.

As a method for eliminating irregularities in brightness X without printing, there is disclosed a technique wherein the light-incident surface of the light-conducting plate is formed as a coarse surface for increasing the amount of scattered light in approaching both lateral ends of the light-incident surface (see Japanese Unexamined Patent Publication No. 160036/1997); however, employing this technique requires an additional process of forming the coarse surface using sandpapers or the like after injection molding of the light-conducting plate.

The present invention has been made in view of the above problems, and provides a sheet-like light source device capable of effectively eliminating irregularities in brightness X without performing printing and capable of being easily manufactured.

SUMMARY OF THE INVENTION

In accordance with the present invention, there is provided a sheet-like light source device of side-light type comprising a light-conducting plate made of a light-transmitting material, at least one rod-like light source disposed proximate to a light-incident surface comprising at least one lateral side end portion of the light-conducting plate, a tubular reflecting member covering portions other than a surface facing the light-conducting plate of the rod-like light source, and a planar reflecting member disposed proximate to a position facing a rear surface of the light-conducting plate, wherein sloped surfaces which are inclined with respect to the light-incident surface of the light-conducting plate are formed proximate to positions of the light-incident surface of the light-conducting plate at which a luminous energy of the rod-like light source is decreased.

It is preferable that the sloped surface is inclined with respect to the light-incident surface at an angle of not less than 6°.

It is preferable that the sloped surface increases in width in approaching the positions at which the luminous energy of the rod-like light source is relatively decreased.

It is preferable that angles formed by the sloped surface and the light-incident surface of the light-conducting plate increase in approaching the positions at which the luminous energy of the rod-like light source is relatively decreased.

It is preferable that the positions at which the luminous energy of the rod-like light source is decreased are positions at which the electrode portions on both ends of the rod-like light source are located.

It is preferable that the sloped surface is formed on a front surface side and/or rear surface side of the light-incident surface of the light-conducting plate.

DETAILED DESCRIPTION

The sheet-like light source device according to the present invention will now be explained in details with reference to the drawings.

EMBODIMENT 1

Figure 1:
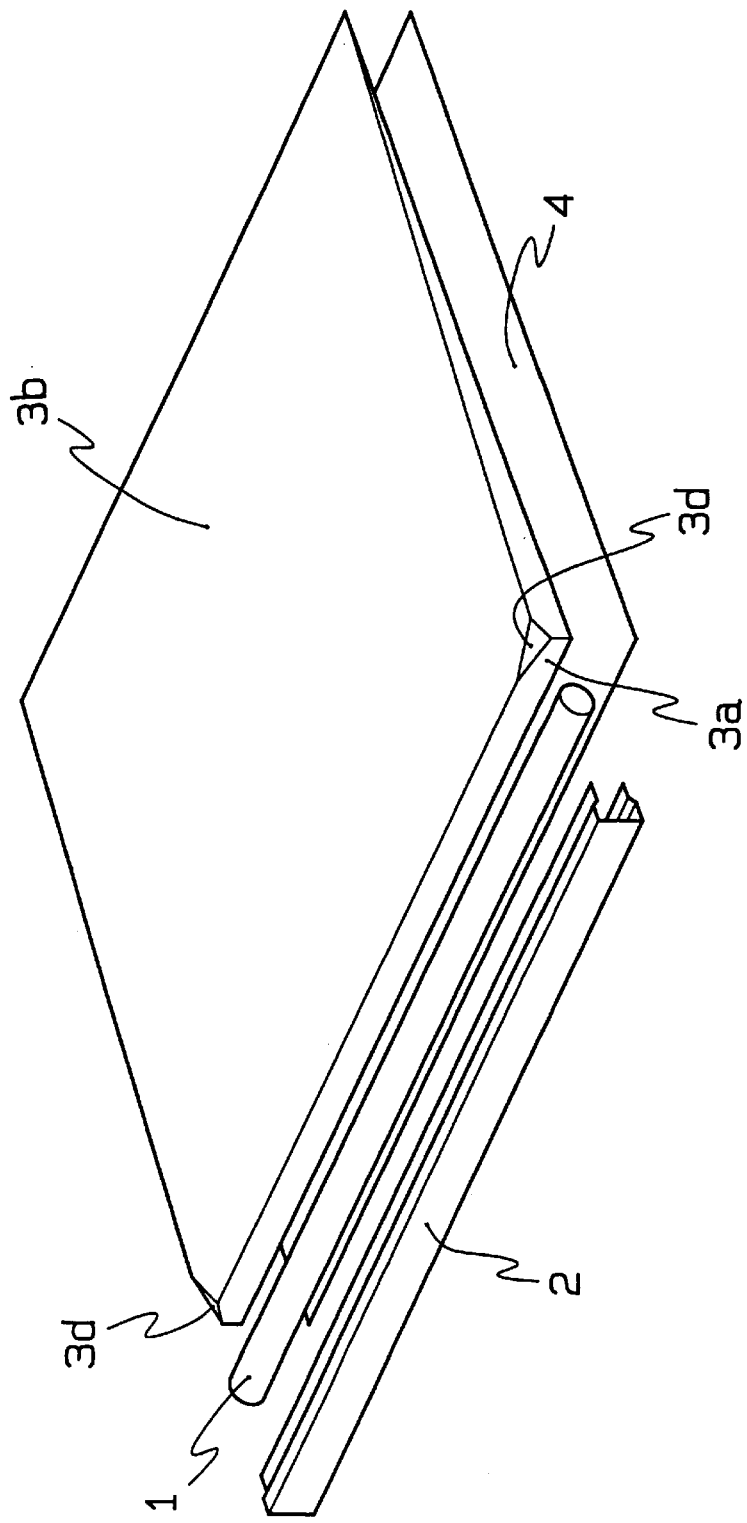
FIG. 1 is an exploded perspective explanatory view showing an embodiment of a sheet-like light source device of the present invention.
Figure 2:
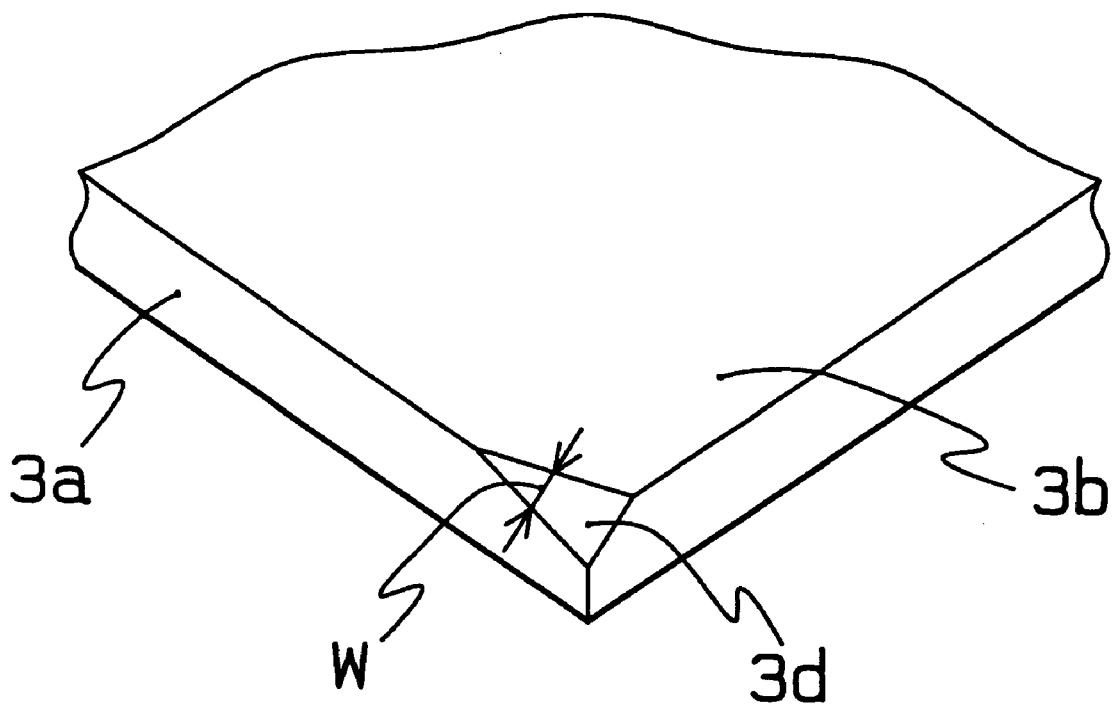
FIG. 2 is a partially enlarged perspective view of a light-conducting plate of FIG. 1.
Figure 3:
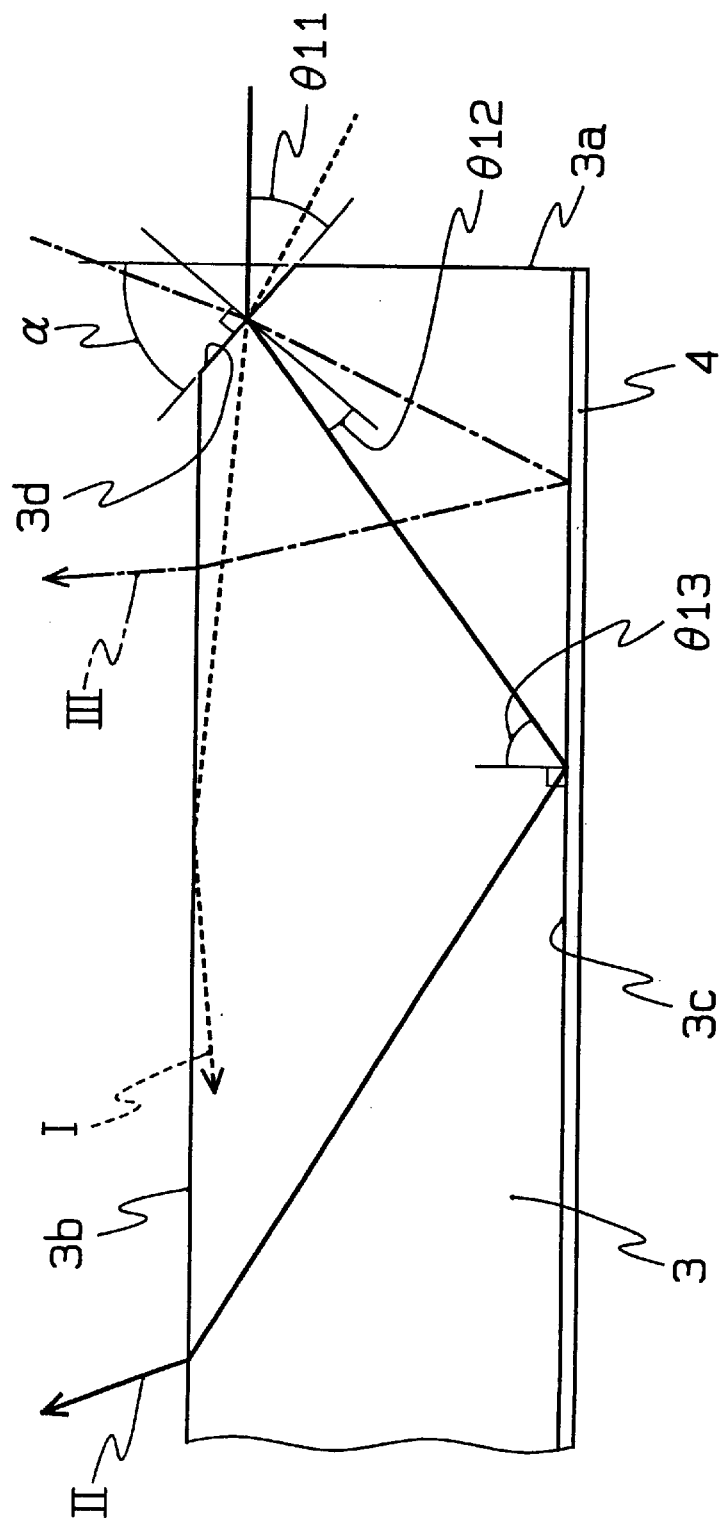
FIG. 3 is a sectional explanatory view showing a portion proximate to a side surface of the light-conducting plate of FIG. 2.

The sheet-like light source device as illustrated in FIGS. 1 to 3 is composed of a lamp serving as a rod-like light source, a lamp reflector 2 serving as a tubular reflecting member, a light-conducting plate 3, and a reflecting sheet 4 serving as a planar reflecting member, wherein sloped surfaces 3d, which are inclined with respect to a light-incident surface 3a of the light-conducting plate 3, are formed proximate to positions of the light-incident surface 3a of the light-conducting plate 3 at which the luminous energy of the lamp 1 is decreased.

Similar to a conventional arrangement, the lamp 1 is generally formed of a cold-cathode tube (CFL) and light emitted from the lamp 1 is made incident to the light-conducting plate 3 either directly or via the lamp reflector 2. The light-conducting plate 3 is made of a transparent material, and polymethyl methacrylate (PMMA) with high a transmission rate of light is generally employed.

Figure 7:
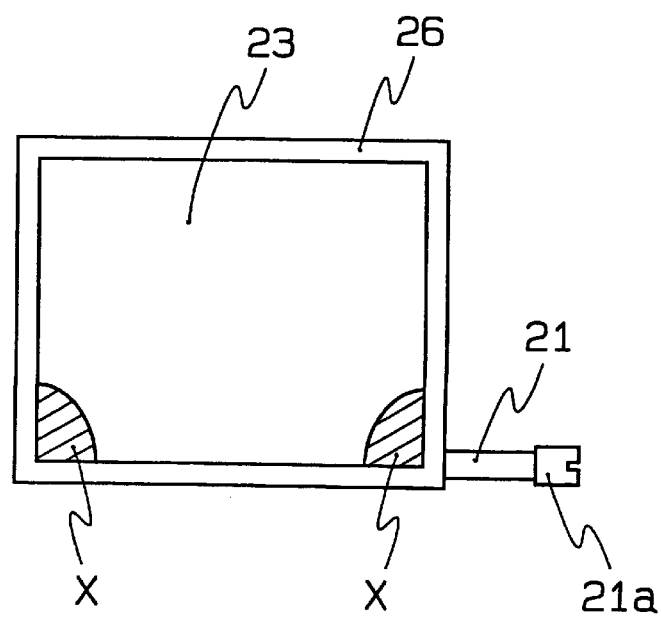
FIG. 7 is a sectional view showing a portion proximate to a side surface of the light-conducting plate of FIG. 5.

The sloped surfaces 3d in FIGS. 1 to 3 have been formed for eliminating irregularities in brightness X (see FIG. 7). Each of the sloped surfaces 3d are formed to form a specified angle a with respect to the light-incident surface 3a. When incident angle $\theta_{11}$ as illustrated in FIG. 3 is in a range of 0 to 90°, an angle $\theta_{12}$ within the light-conducting plate 3 will accordingly be in a range of 0 to 42° owing to Snell's law of fraction. The angles $\theta_{13}$ at which the incident light hits against a front surface 3b and a rear surface 3c of the light-conducting plate 3 will be as follows.

(1) As illustrated by path I in FIG. 3, light which is made incident from the rear surface 3c side to the sloped surface 3d and hitting the front surface 3b will satisfy $\theta_{13}=90°+\alpha-\theta_{12}$, while $0 \leq \theta_{12} \leq 42°$ is satisfied within the light-conducting plate 3 owing to Snell's law of fraction. Thus, $\theta_{13}$ will always be larger than the total reflection angle 42 of PMMA regardless of the value for $\alpha$, and total reflection will come true.

(2) As illustrated by path II in FIG. 3, light which is made incident from the lamp 1 side to hit against the sloped surface 3d in a substantially horizontal manner will satisfy $\theta_{13}=90°-\alpha+\theta_{12}$. Since $0 \leq \theta_{12} \leq 42°$ is satisfied as in the above case, a part of incident light will be deviated from the total reflection condition within the light-conducting plate 3 when a is a value of not less than 48° (that is, $\theta_{13}<42°$ will come true) so that light is emitted from the front surface 3d side.

(3) As illustrated by path III in FIG. 3, light which is made incident from the front surface 3b side to the sloped surface 3d and hits the rear surface 3c will satisfy $\theta_{13}=90°-\alpha-\theta_{12}$. When $\alpha \geq 6°$ is satisfied, a part of light will be deviated from the total reflection condition while all of the light will fall beyond the total reflection condition when $\alpha \geq 48°$ is satisfied, and light will be emitted from the front surface 3b side.

It is obvious from the above that when $\alpha \geq 6°$ is satisfied, at least light of path III in FIG. 3 from among light which is made incident from the sloped surfaces 3d will be deviated from the total reflection condition of light within the light-conducting plate 3, and light might be emitted to a position at which irregularities in brightness X are generated (see FIG. 7). It should be noted that while there is no particular upper limit for the value a, the sloped surfaces 3d and the front surface 3b will be coincident when $\alpha=90°$ is satisfied, and will thus make no sense.

The amount of light deviating from the total reflection condition is proportional to widths W of the sloped surfaces 3d (see FIG. 2). Thus, it is possible to eliminate irregularities in brightness X by forming sloped surfaces 3d with angles a being formed with respect to the light-incident surface 3a of the light-conducting plate 3 and by increasing the widths W in approaching position at which the luminous energy from the lamp 1 will be relatively decreased as illustrated in FIGS. 2 and 3. At this time, $\alpha$ needs to be not less than 6° as described above. While light hitting against the sloped surfaces 3d will also be present from among light made incident from the light-incident surface 3a facing the lamp 1 side, this light will satisfy the total reflection condition and will not be useless.

EMBODIMENT 2

Figure 4:
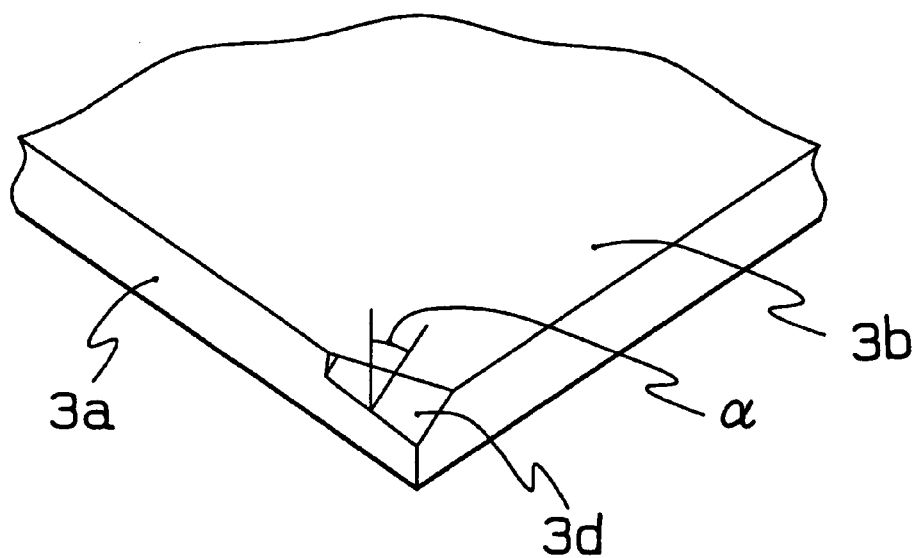
FIG. 4 is a partially enlarged perspective view of a light-conducting plate according to another embodiment of the sheet-like light source device of the present invention.
Figure 5:
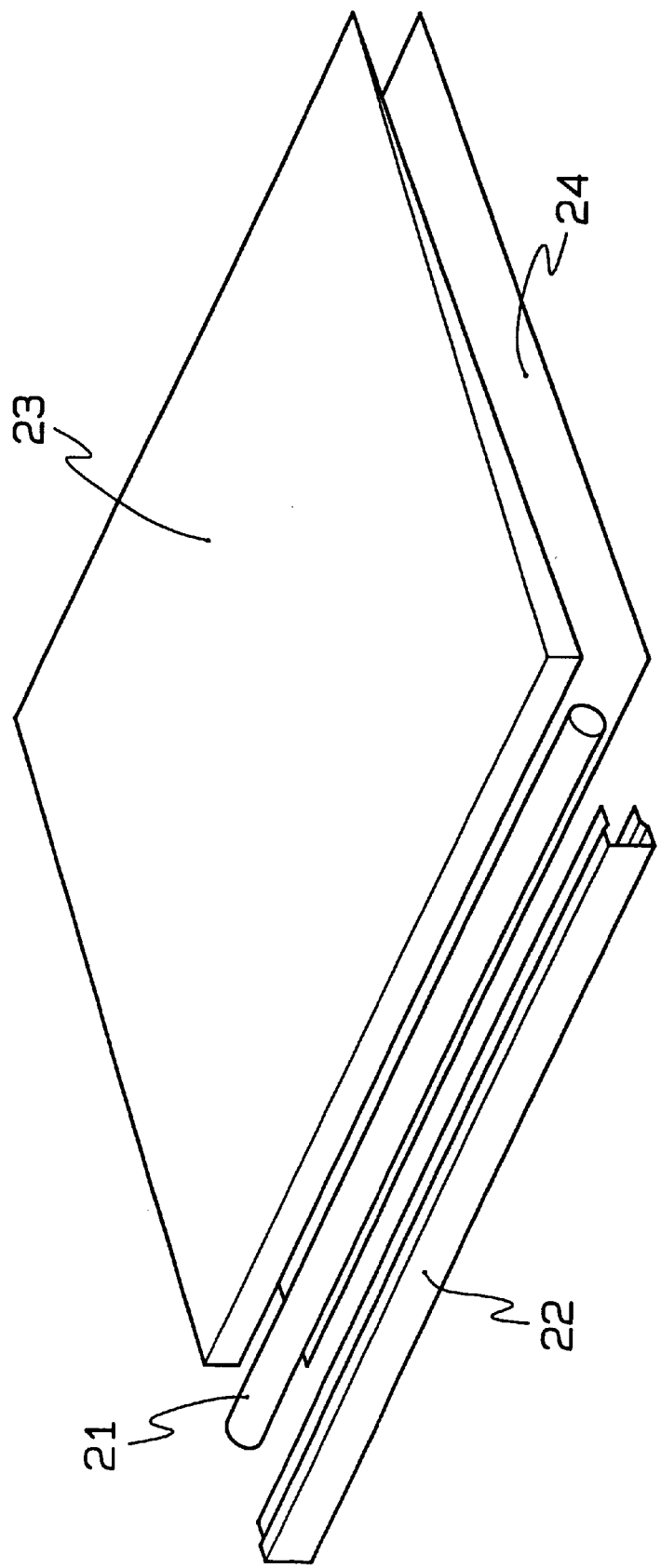
FIG. 5 is an exploded perspective view of a conventional sheet-like light source device.

When the angles a formed between the light-incident surface 3a of the light-conducting plate 3 and the sloped surfaces 3d are not less than 6°, the amount of light which does not meet the total reflection condition will be increased with respect to $\theta_{13}$ with the value for a increasing. Since the luminous energy from the lamp 1 will be reduced in approaching electrode portions (not shown) formed on both ends of the lamp 1 as illustrated in FIG. 4, it is possible to eliminate irregularities in brightness X by increasing the value a in accordance therewith. That is, the light-conducting plate 3 will, in this case, be of a shape wherein the value for a is gradually increased in approaching both ends thereof. On the other hand, a shall be becoming smaller in a central direction of the lamp 1 since the luminous energy from the lamp 1 is satisfactory. Unless $\alpha=0$ is satisfied at both end portions of the sloped surfaces 3d in the central direction of the lamp 1, strip-like irregularities in brightness will be caused through a level difference with the light-incident surface 3a.

Figure 6:
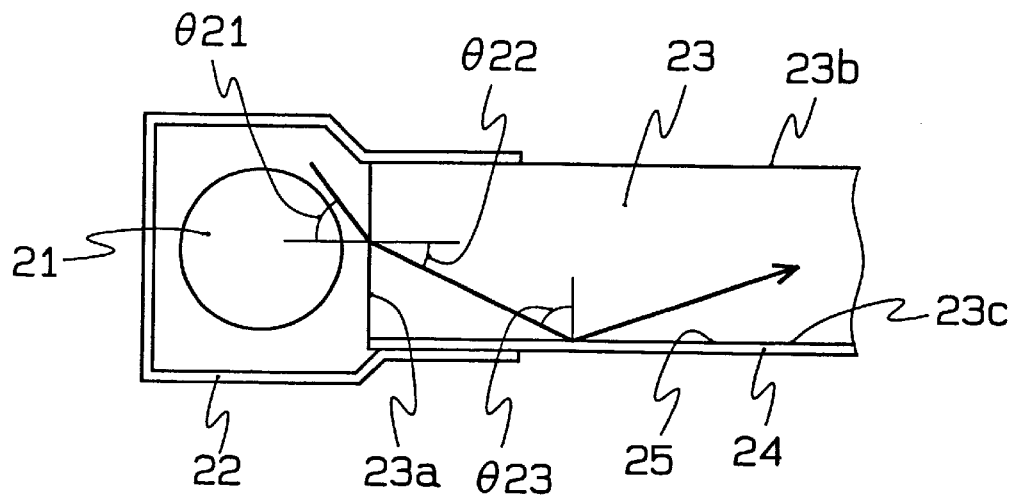
FIG. 6 is a partially enlarged perspective view of a light-conducting plate of FIG. 5.

While the Embodiments 1 and 2 have been explained with reference to light-conducting plates with no scattering portions 25 (see FIG. 6) being printed thereon, the present invention is not limited to this arrangement, and it is alternatively possible to employ the invention to conventional light-conducting plates with scattering portions 25 being printed.

While sloped surfaces 3d are formed only on the front surface 3b side of the light-conduction plate 3 in the above-described Embodiments 1 and 2, it is alternatively possible to form the sloped surfaces on the rear surface 3c side of the light-conducting plate 3 or on both the front surface 3b side and the rear surface 3c side of the light-conducting plate 3.

While the Embodiments 1 and 2 have been explained with reference to light-conducting plates of wedge-like type which are favorably employed in sidelight type sheet-like light sources, it is alternatively possible to employ a light-conducting plate of flat-plate type. More particularly, sloped surfaces 3d might be formed at each of the side surfaces of the sidelight type sheet-like light source including rod-like light sources on at least two side surfaces of the light-conducting plate. It is similarly possible in a sidelight type sheet-like light source device employing no fluorescent lamps to eliminate irregularities in brightness by forming sloped surfaces by cutting corners of the light-conducting plate at which the luminous energy from the light source is weak.

According to the present invention, it is possible to effectively eliminate generation of irregularities of brightness also in case the sheet-like light source device employs a light-conducting plate having no scattering portions through printing.

Since sloped surfaces can be integrally formed when molding the light-conducting plate in the present invention, easy manufacture is enabled without the need of performing an additional process.

What is claimed is:

1. A light source device of side-light type comprising a light-conducting plate made of a light-transmitting material, at least one tubular light source disposed proximate to a light-incident surface comprising at least one lateral side end portion of the light-conducting plate, a tubular reflecting member covering portions of the tubular light source other than a surface facing the light-conducting plate, and a planar reflecting member disposed proximate to a position facing a rear surface of the light-conducting plate, wherein sloped surfaces on the light conducting plate which are inclined with respect to the light-incident surface of the light-conducting plate are located proximate to where a luminous energy of the tubular light source is decreased.

2. The light source device of claim 1, wherein the sloped surface on the light conducting plate is inclined with respect to the light-incident surface at an angle of not less than 6°.

3. The light source device of any one of claims 1 and 2 wherein the sloped surface on the light conducting plate increases in width in approaching the positions at which the luminous energy of the tubular light source is relatively decreased.

4. The light source device of any one of claims 1 and 2, wherein angles formed by the sloped surface on the light conducting plate and the light-incident surface of the light-conducting plate increase in approaching the positions at which the luminous energy of the tubular light source is relatively decreased.

5. The light source device of any one of claims 1 and 2, wherein the positions at which the luminous energy of the tubular light source is decreased are located at electrode portions on both ends of the tubular light source.

6. The light source device of any one of claims 1 and 2, wherein the sloped surface on the light conducting plate is formed on at least one of a front surface side and a rear surface side of the light-incident surface of the light-conducting plate.

* * * * *